(12) United States Patent
Hyun et al.

(10) Patent No.: US 9,808,134 B2
(45) Date of Patent: Nov. 7, 2017

(54) DUST COLLECTOR FOR VACUUM CLEANER

(71) Applicant: LG ELECTRONICS INC., Seoul (KR)

(72) Inventors: Kietak Hyun, Seoul (KR); Seungyeop Lee, Seoul (KR); Hyukjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 14/642,179

(22) Filed: Mar. 9, 2015

(65) Prior Publication Data

US 2016/0088989 A1    Mar. 31, 2016

(30) Foreign Application Priority Data

Sep. 29, 2014    (KR) .......................... 10-2014-0130428

(51) Int. Cl.
*A47L 9/16*    (2006.01)
*B04C 3/04*    (2006.01)
(Continued)

(52) U.S. Cl.
CPC ............. *A47L 9/1641* (2013.01); *A47L 9/165* (2013.01); *A47L 9/1608* (2013.01);
(Continued)

(58) Field of Classification Search
CPC .... A47L 9/1608; A47L 9/1625; A47L 9/1641; A47L 9/165; A47L 9/1666; A47L 9/1683;
(Continued)

(56) References Cited

U.S. PATENT DOCUMENTS 7,958,598 B2 *    6/2011    Yun .......................... A47L 9/108
                                                                   15/347
7,992,252 B2 *    8/2011    Park ...................... A47L 9/0081
                                                                   15/323
(Continued)

FOREIGN PATENT DOCUMENTS

EP    1952744 A1    8/2008
EP    2201880 A2    6/2010
(Continued)

*Primary Examiner* — Marc Carlson
(74) *Attorney, Agent, or Firm* — Birch, Stewart, Kolasch & Birch, LLP (57) ABSTRACT

A dust collector for a vacuum cleaner disclosed herein includes a first cyclone to primarily separate dust from air introduced from a lower portion thereof with containing foreign materials and discharge the separated dust into the first dust storing unit, a second cyclone extending in an intersecting direction with an extending direction of the first cyclone and configured to secondarily separate fine dust from the air introduced from the first cyclone and discharge the separated fine dust into a second dust storing unit, and a lower cover defining a bottom surface of the first dust storing unit, the second dust storing unit and the first cyclone and coupled to the first dust storing unit by a hinge such that the foreign materials collected in the first dust storing unit, the second dust storing unit and the first cyclone are discharged upon being open.

20 Claims, 10 Drawing Sheets (51) Int. Cl.
   *B01D 50/00* (2006.01)
   *B01D 45/16* (2006.01)
   *B01D 46/48* (2006.01)
(52) U.S. Cl.
   CPC ............ *A47L 9/1625* (2013.01); *A47L 9/1666* (2013.01); *A47L 9/1683* (2013.01); *B01D 45/16* (2013.01); *B01D 46/48* (2013.01); *B01D 50/002* (2013.01); *B04C 3/04* (2013.01)
(58) Field of Classification Search
   CPC ...... B01D 45/16; B01D 46/48; B01D 50/002; B04C 3/04
   See application file for complete search history.

(56) References Cited

U.S. PATENT DOCUMENTS

| | | | | |
|---|---|---|---|---|
| 7,998,234 B2* | 8/2011 | Hwang | ............... | A47L 5/365 55/428 |
| 8,012,250 B2* | 9/2011 | Hwang | ............... | A47L 5/365 55/429 |
| 8,151,409 B2* | 4/2012 | Ha | ................... | A47L 9/108 15/327.2 |
| 8,544,143 B2* | 10/2013 | Hwang | ............... | A47L 9/108 15/352 |
| 2006/0150587 A1* | 7/2006 | Hong | ................. | A47L 5/365 55/343 |
| 2007/0079585 A1* | 4/2007 | Oh | ..................... | A47L 9/1625 55/345 |
| 2007/0079587 A1* | 4/2007 | Kim | ................... | A47L 9/1608 55/349 |
| 2007/0084160 A1* | 4/2007 | Kim | ................... | A47L 5/28 55/345 |
| 2007/0084161 A1* | 4/2007 | Yoo | ................... | A47L 9/1625 55/345 |
| 2008/0023036 A1* | 1/2008 | Ha | ..................... | A47L 5/365 134/21 |
| 2008/0184681 A1* | 8/2008 | Oh | ..................... | A47L 9/1625 55/345 |
| 2010/0162517 A1* | 7/2010 | Han | ................... | A47L 9/1608 15/352 |
| 2010/0205915 A1* | 8/2010 | Oh | ..................... | A47L 9/1625 55/318 |
| 2012/0210537 A1* | 8/2012 | Makarov | ............ | A47L 9/1608 15/353 |
| 2014/0137363 A1* | 5/2014 | Wilson | ................. | A47L 5/24 15/347 |

FOREIGN PATENT DOCUMENTS

| | | |
|---|---|---|
| JP | 4856271 B2 | 1/2012 |
| KR | 10-0672483 B1 | 1/2007 |
| KR | 20090119398 A * | 11/2009 |

* cited by examiner

DUST COLLECTOR FOR VACUUM CLEANER

CROSS-REFERENCE TO RELATED APPLICATION

Pursuant to 35 U.S.C. §119(a), this application claims the benefit of earlier filing date and right of priority to Korean Application No. 10-2014-0130428, filed on Sep. 29, 2014, the contents of which is incorporated by reference herein in its entirety.

BACKGROUND OF THE DISCLOSURE

1. Field of the Disclosure

This specification relates to a dust collector for a vacuum cleaner, capable of separating and collecting dust from air introduced into the vacuum cleaner and easily discharging the collected dust through a multi-cyclonic method.

2. Background of the Disclosure

In general, a dust collector is an apparatus for collecting dust, such as hairs, dirt, and the like, contained in air using a cyclonic principle, and generally applied to vacuum cleaners.

To improve dust collecting efficiency, a multi-cyclone dust collector that a plurality of cyclones are connected is used in recent time.

Typically, the multi-cyclone dust collector includes an upstream cyclone and a downstream cyclone that is connected to the upstream cyclone and collects relatively small dust. Also, the downstream cyclone is often provided with a plurality of small cyclones.

Hereinafter, description will be given of a cyclone dust collector for a vacuum cleaner according to the related art.

The cyclone dust collector includes a first cyclone that primarily collects dust by sucking external polluted air, and a second cyclone that is connected to the first cyclone and secondarily collects fine dust. In a multi-cyclone type, the second cyclone is a set of a plurality of small cyclones.

The second cyclone corresponding to the plurality of small cyclones is installed along an outer circumference of the first cyclone. A first inlet through which external polluted air is introduced in a tangential direction is provided on a top of a first body of the first cyclone. A first outlet through which the air with the dust primarily separated therefrom is discharged toward the second cyclone is located approximately at a center in the first body of the first cyclone. The first outlet is typically formed in a cylindrical shape and has a structure with a lower portion open and an upper portion closed. In some cases, a filter is installed at the lower opening.

Meanwhile, the second cyclone corresponds to the plurality of small cyclones which are located along the outer circumference of the first cyclone. Of course, each second cyclone (i.e., each small cyclone) has a second inlet and a second outlet. Typically, a buffering space is defined between the first cyclone and the second cyclones, such that air drawn out of the first cyclone is introduced into the second cyclones via the buffering space. Also, a discharge space which communicates with the second outlets of the plurality of second cyclones is located at an upper part of the second cyclones. The air is externally discharged through a discharge pipe via the discharge space.

An operation of the related art multi-cyclone dust collector will now be described.

When a suction force generating element, for example, a suction fan of a vacuum cleaner is driven in response to an activation of the multi-cyclone dust collector, external polluted air is introduced into the first cyclone through the first inlet of the first cyclone. Here, the polluted air is introduced in a tangential direction, and orbits along an inner wall surface of the first body of the first cyclone. During the orbiting motion, dust is separated from the air by a centrifugal force.

Here, relatively heavy, large dust is collected on a bottom of the first cyclone, and small dust without being separated flows up while orbiting in the first cyclone and then is discharged through the first outlet.

Meanwhile, air containing fine dust, discharged from the first cyclone, is introduced into the second cyclones through the second inlets. Therefore, the fine dust is separated from the air again in the second cyclones, such that purified air is discharged to the outside sequentially through the second outlets, the discharge space and the discharge pipe.

However, the related art dust collector for the vacuum cleaner has the following problems.

When a filter is provided in the first cyclone, large dust, such as hairs, foreign materials and the like, has to be primarily filtered out by the filter and separated, and fine dust and air have to be introduced into the second cyclones through the filter. Afterwards, the fine dust is separated from the air in the second cyclones.

However, the large dust is stuck on the filter of the first cyclone and accordingly the filter fails to filter out and collect some of the large dust. Also, the dust stuck on the filter interferes with the flow of the fine dust. Consequently, the large dust and the fine dust are stuck and entangled on the filter.

Even when discharging dust by opening a cover of the dust collector, such dust stuck and entangled on the filter is uneasy to be separated from the filter. Also, the large dust stuck on the filter interferes with the flow of air, lowering overall efficiency of the vacuum cleaner.

Also, to externally discharge dust collected in the dust container, the first cyclone or a first or second dust storing unit should be individually detached from the dust collector, or a cover of the first cyclone or the first or second dust storing unit should be individually open. As a result, several processes are required for discharging the dust.

SUMMARY OF THE DISCLOSURE

Therefore, to solve those problems of the related art, an aspect of the detailed description is to provide a structure for efficiently separating dust stuck on a filter of a first cyclone, and a structure of a cover which forms (defines) a bottom surface of the first cyclone and first and second dust storing units.

To achieve these and other advantages and in accordance with the purpose of this specification, as embodied and broadly described herein, there is provided a dust collector for a vacuum cleaner including a first cyclone that is provided in a first dust storing unit, and configured to primarily separate dust from air introduced from a lower portion thereof with containing foreign materials and discharge the separated dust into the first dust storing unit, a second cyclone that is provided above the first cyclone to extend in an intersecting direction with an extending direction of the first cyclone, and configured to secondarily separate fine dust from the air introduced from the first cyclone and discharge the separated fine dust into a second dust storing unit, and a lower cover that defines a bottom surface of the first dust storing unit, the second dust storing unit and the first cyclone, and coupled to the first dust storing unit by a hinge such that the foreign materials collected in the first dust storing unit, the second dust storing unit and the first cyclone are discharged upon being open.

In accordance with one exemplary embodiment disclosed herein, the first cyclone may include a mesh filter that is configured to separate the dust from the air in a filtering manner.

An upper portion of the mesh filter may be connected to an inlet of the second cyclone such that air passed through the mesh filter is introduced into the second cyclone.

The mesh filter may be formed in a conic shape of getting narrower from top to bottom thereof, such that the dust filtered by the mesh filter and stuck on the mesh filter is separated from the mesh filter.

The mesh filter may be provided in the first cyclone and extend substantially in the same direction as the extending direction of the first cyclone.

In accordance with another exemplary embodiment disclosed herein, the second dust storing unit may be provided in the first dust storing unit, and further include a guide surface that is formed inclined to guide fine dust separated from the air by the second cyclone into the second dust storing unit.

In accordance with another exemplary embodiment disclosed herein, the second dust storing unit may be provided in the first dust storing unit and extend substantially in the same direction as the extending direction of the first dust storing unit.

The second dust storing unit may be formed in a cylindrical shape and disposed to come in contact with an outer circumferential surface of the first cyclone and an inner circumferential surface of the first dust storing unit.

The second dust storing unit may be provided by two. The two second dust storing units may be arranged to come in contact with an outer circumferential surface of the first cyclone and an inner circumferential surface of the first dust storing unit, respectively.

In accordance with another exemplary embodiment disclosed herein, the second cyclone may be provided in plurality. The plurality of second cyclones may extend in parallel with one another.

The plurality of second cyclones may be laminated into plural layers.

To achieve these and other advantages and in accordance with the purpose of this specification, as embodied and broadly described herein, there is provided a vacuum cleaner, including a main body that is provided with a motor generating a rotational force, a suction part that is configured to suck air containing dust, and a dust collector that is configured to separate the dust from the air introduced from the suction part and discharge the separated dust, wherein the dust collector may include a first cyclone that is provided in a first dust storing unit, and configured to primarily separate dust from air introduced from a lower portion thereof with containing foreign materials and discharge the separated dust into the first dust storing unit, a second cyclone that is provided above the first cyclone to extend in an intersecting direction with an extending direction of the first cyclone, and configured to secondarily separate fine dust from the air introduced from the first cyclone and discharge the separated fine dust into a second dust storing unit, and a lower cover that defines a bottom surface of the first dust storing unit, the second dust storing unit and the first cyclone, and coupled to the first dust storing unit by a hinge such that the foreign materials collected in the first dust storing unit, the second dust storing unit and the first cyclone are discharged upon being open.

A dust collector according to one exemplary embodiment disclosed herein may be provided with a lower cover defining a bottom surface of a first cyclone, and first and second dust storing units. This may allow for discharging dust collected in the first cyclone and the first and second dust storing units at once when the lower cover is open.

A dust collector according to another exemplary embodiment disclosed herein may be provided with a mesh filter which is provided in a first cyclone and has a conic shape of getting narrower from top to bottom thereof. This may allow for more efficiently separating and discharging large dust stuck on the mesh filter.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments disclosed herein to facilitate for the practice of those person skilled in the art to which the present disclosure belongs, with reference to the accompanying drawings. The present disclosure will be realized in different configurations, without being limited to those exemplary embodiments disclosed herein.

For the sake of brief description with reference to the drawings, the same or equivalent components will be provided with the same reference numbers, and description thereof will not be repeated. A singular representation may include a plural representation unless it represents a definitely different meaning from the context.

Figure 1:
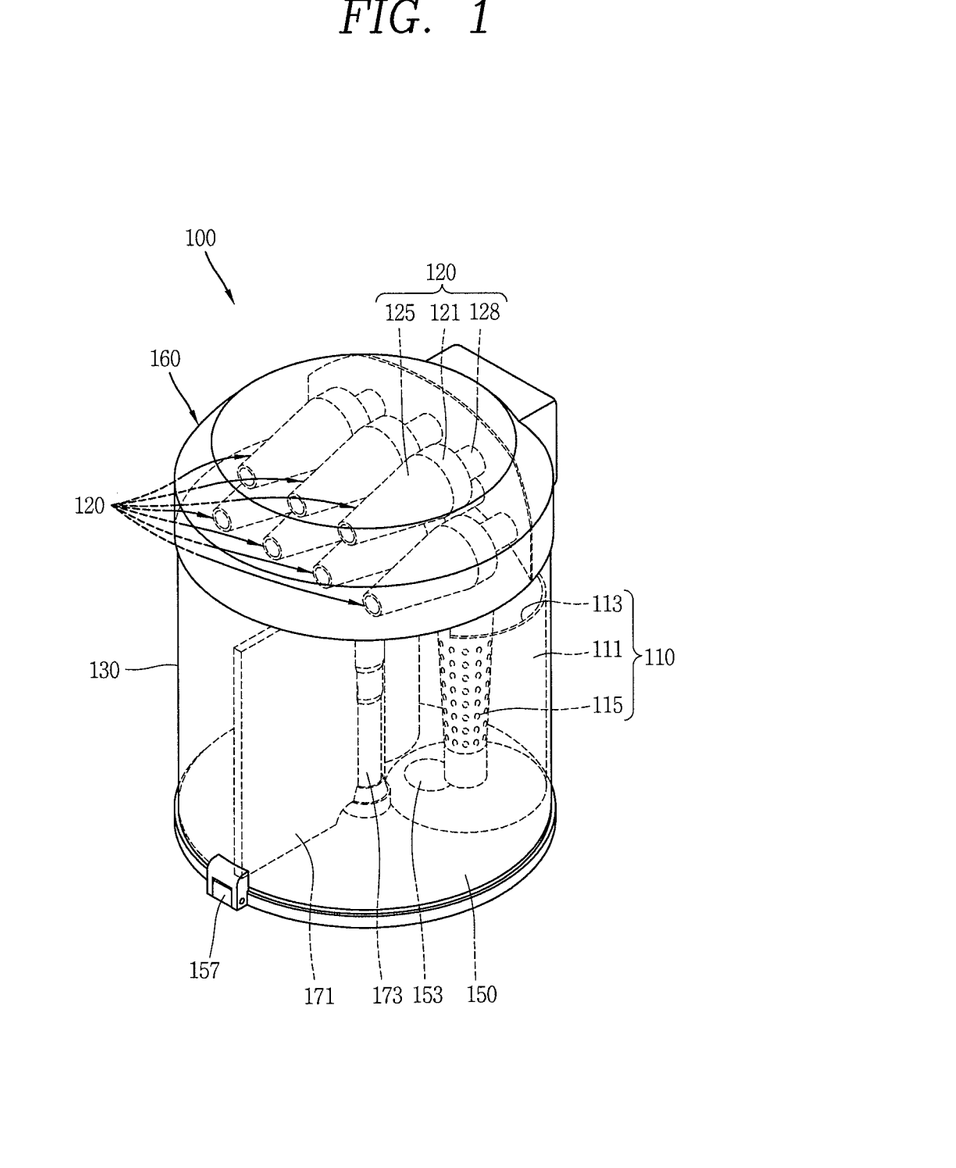
FIG. 1 is a perspective view of a dust collector for a vacuum cleaner in accordance with one exemplary embodiment disclosed herein.
Figure 2:
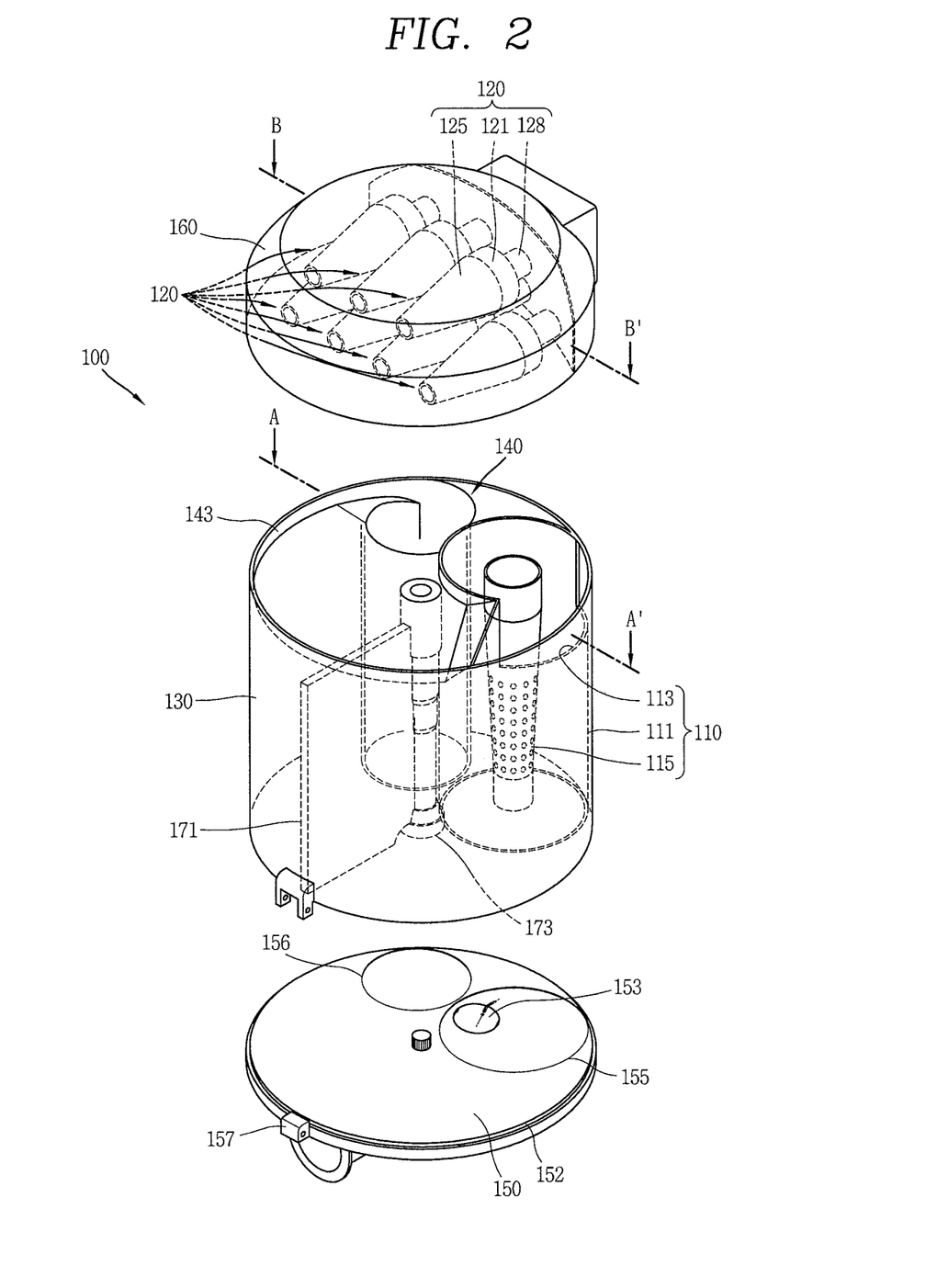
FIG. 2 is a conceptual view illustrating a part of the dust collector of FIG. 1 in a disassembled state.
Figure 3:
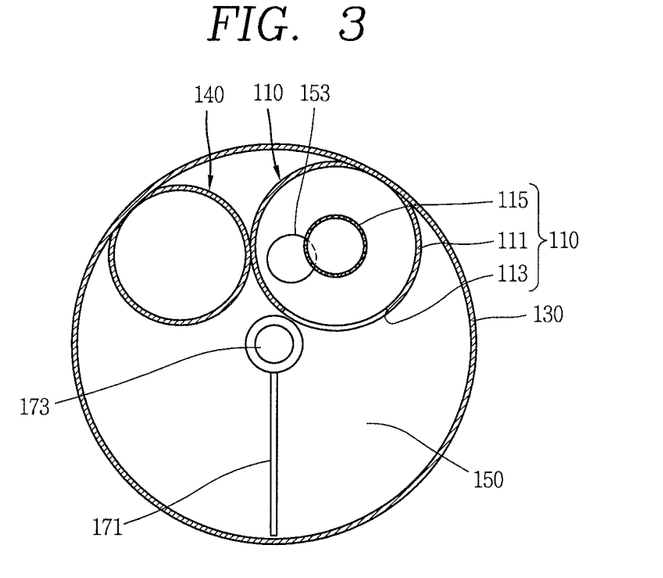
FIG. 3 is a sectional view taken along the line A-A' of FIG. 2.

FIG. 1 is a perspective view of a dust collector 100 for a vacuum cleaner in accordance with one exemplary embodiment disclosed herein, FIG. 2 is a conceptual view illustrating a part of the dust collector 100 of FIG. 1 in a disassembled state, and FIG. 3 is a sectional view taken along the line A-A' of FIG. 2.

As illustrated in FIGS. 1 to 3, the dust collector 100 for the vacuum cleaner may include a first cyclone 110, a second cyclone 120, a first dust storing unit 130, a second dust storing unit 140, and a lower cover 150.

The first cyclone 110 may primarily separate dust from air, which is introduced along with foreign materials through an introduction opening 153 formed through a bottom surface thereof, and discharge the separated dust into the first dust storing unit 130. The first cyclone 110 may include a housing 111 and a mesh filter 115.

The housing 111 of the first cyclone 110 may be located within the first dust storing unit 130. The housing 111 may be formed in a cylindrical shape such that dust can be separated and discharged from air using a centrifugal force.

For example, the housing 111 of the first cyclone 110 may extend substantially in the same direction as an extending direction of the first dust storing unit 130, so as to form an appearance of the first cyclone 110. The housing 111 may allow air or dust introduced through a lower part thereof to orbit therein.

Also, a cutoff portion 113 may further be formed at an upper part of the housing 111, such that large dust can be discharged from the first cyclone 110 to the first dust storing unit 130 therethrough.

The mesh filter 115 filters out the large dust from the introduced air.

In order for the air passed through the mesh filter 115 to flow up into an introduction pipe 121 of the second cyclone 120 to be explained later, an upper portion of the mesh filter 114 is connected to the introduction pipe 121 of the second cyclone 120 through a space of an upper surface of the first cyclone 110.

The mesh filter 115 may be formed in a manner of extending substantially in the same direction as the extending direction of the first cyclone 110, and formed in a conic shape of getting narrower from top to bottom thereof. The structure of the mesh filter 115 may more facilitate dust, which is stuck on the mesh filter 115, to be separated from the mesh filter 115 when opening the lower cover 150.

The first dust storing unit 130 may be configured such that the large dust discharged from the first cyclone 110 is collected therein. Also, the first dust storing unit 130 has a structure of accommodating therein the first cyclone 110, the second dust storing unit 140 and a compression plate 171.

The first dust storing unit 130 is formed in a cylindrical shape, which may define a part of the appearance of the dust collector 100. A casing (not illustrated) may further be provided at an outside of the first dust storing unit 130 so as to define the part of the appearance of the dust collector 100. The first dust storing unit 130 or the casing (not illustrated) may be formed transparent such that an amount of dust collected in the first dust storing unit 130 is visible.

The compression plate 171 for compressing dust may be rotatably provided in the first dust storing unit 130. The compression plate 171 may compress the dust collected in the first dust storing unit 130. Accordingly, an increased space may be ensured in the first dust storing unit 130 and thus more dust may be collected.

The compression plate 171 may compress dust by rotating in one direction centering on a central shaft 173. When its rotation in the one direction is interrupted due to foreign materials or large dust during the rotation, the compression plate 171 may switch the rotating direction to rotate in a reverse direction.

The second cyclone 120 secondarily separates fine dust from the air, which has been introduced sequentially through the upper portion of the mesh filter 115 and an inlet 122, and discharges the separated fine dust. The discharged fine dust is collected into the second dust storing unit 140 along a guide surface 143.

The second cyclone 120 is located above the first cyclone 110 and extends in an intersecting direction with the extending direction of the first cyclone 110. For example, the second cyclone 120 may extend horizontal to a bottom surface of the first cyclone 110.

To prevent the fine dust, which has been separated and discharged from the second cyclone 120, from being scattered to outside, a fine dust discharge opening 126 which is formed at an end portion of the fine dust discharge pipe 125 has a hermetic structure of being covered with an upper casing 160.

The upper casing 160 may be coupled to the first dust storing unit 130 or a lower casing (not illustrated) of the first dust storing unit 130. A detailed structure of the second cyclone 120 will be explained later.

The second dust storing unit 140 is configured such that the fine dust discharged from the second cyclone 120 is collected therein. The second dust storing unit 140 may be formed in a cylindrical shape. In addition to the cylindrical shape, the second dust storing unit 140 may have various shapes suitable for collecting the fine dust therein.

The second dust storing unit 140 includes a guide surface 143 which is inclined. The guide surface 143 guides the fine dust separated from the air by the second cyclone 120 to be collected in the second dust storing unit 140.

The lower cover 150 defines the bottom surface of the first dust storing unit 130, the second dust storing unit 140 and the first cyclone 110. The lower cover 150 may be coupled to the first dust storing unit 130 by a hinge 157 so as to open and close the first dust storing unit 130. For example, the lower cover 150 may be formed in a shape of a thin plate, or be implemented into various shapes suitable for closing the bottom surface of the first dust storing unit 130, the second dust storing unit 140 and the like.

The lower cover 150 may be provided with a plurality of sealing members 152, 155 and 156 for sealing lower portions of the first dust storing unit 130, the second dust storing unit 140 and the first cyclone 110. An introduction opening 153 may be formed through the bottom surface of the first cyclone 110 of the lower cover 150. Dust containing foreign materials may be introduced into the first cyclone 110 through the introduction opening 153.

Figure 4:
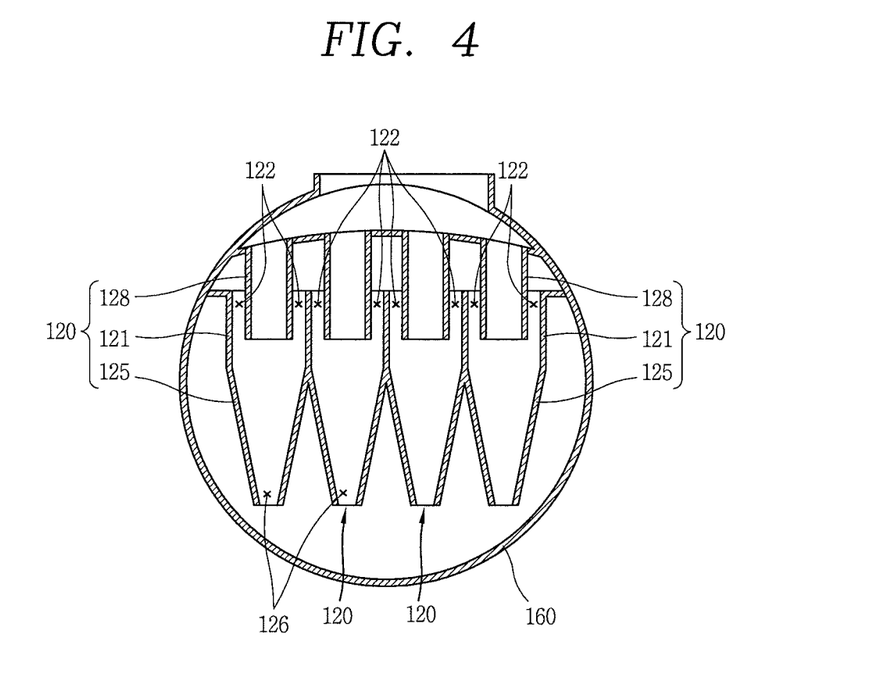
FIG. 4 is a sectional view taken along the line B-B' of FIG. 2.

FIG. 4 is a sectional view taken along the line B-B' of FIG. 2.

Hereinafter, a structure of the second cyclone 120 will be described with reference to FIGS. 2 and 4.

The second cyclone 120 may include an introduction pipe 121, a fine dust discharge pipe 125, and an air discharge pipe 128.

An inlet 122 is formed at an end portion of the introduction pipe 121 of the second cyclone 120. Air flowed through the mesh filter 115 is introduced into the introduction pipe 121 through the inlet 122. The introduction pipe 121 may be formed in a cylindrical shape such that the air can orbit therein.

The fine dust discharge pipe 125 is formed in a shape of a conic pipe of getting narrower in a discharging direction of the fine dust. Accordingly, the fine dust may be separated from the air and discharged through the fine dust discharge pipe 125.

The air discharge pipe 128 is a pipe for externally discharging air from which the fine dust has been separated by the second cyclone 120, and may be formed in a cylindrical shape.

The second cyclone 120 may be provided in plurality. The plurality of second cyclones 120 may extend in parallel with one another, and have a structure of being laminated (stacked) into plural layers. FIG. 2 exemplarily illustrates the arrangement of the plurality of second cyclones 120 that four of the plurality of second cyclones 120 extend in parallel at a lower layer and three of the second cyclones 120 extend in parallel at an upper layer.

The second cyclone 120 has the fine dust discharge pipe 125 with the structure of getting narrower and is provided in plurality, thereby implementing a structure of more effectively separating and discharging the fine dust.

Figure 5:
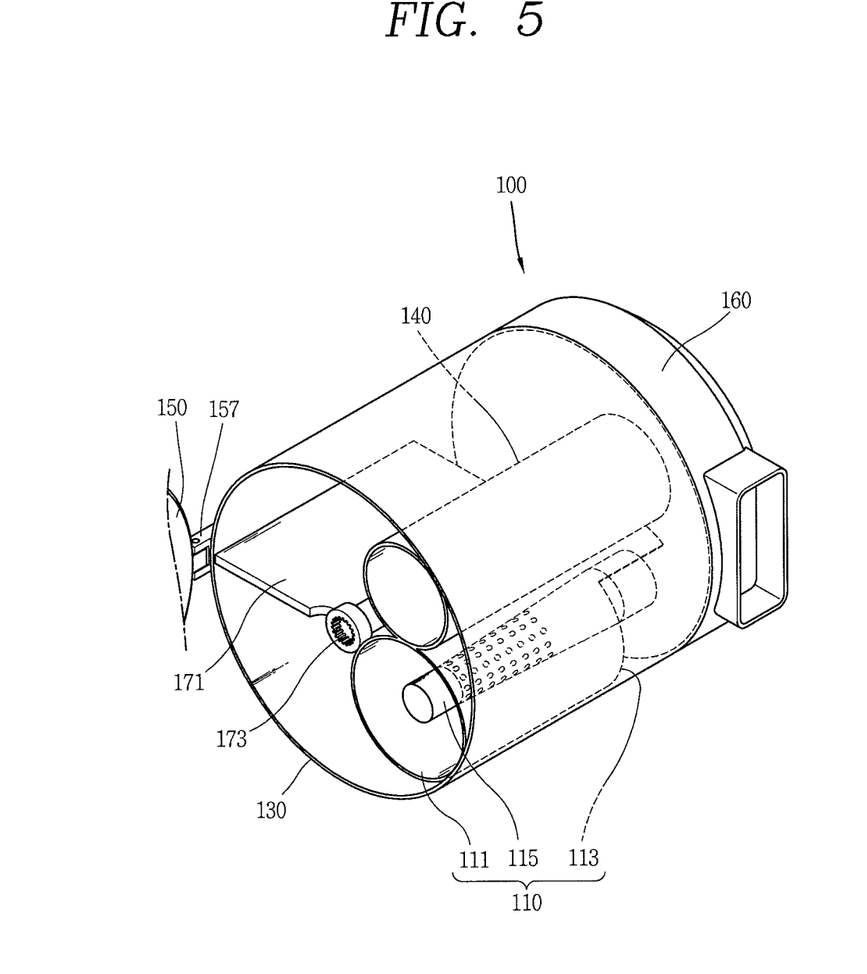
FIG. 5 is a conceptual view illustrating the dust collector of FIG. 1 with a lower cover open.
Figure 6:
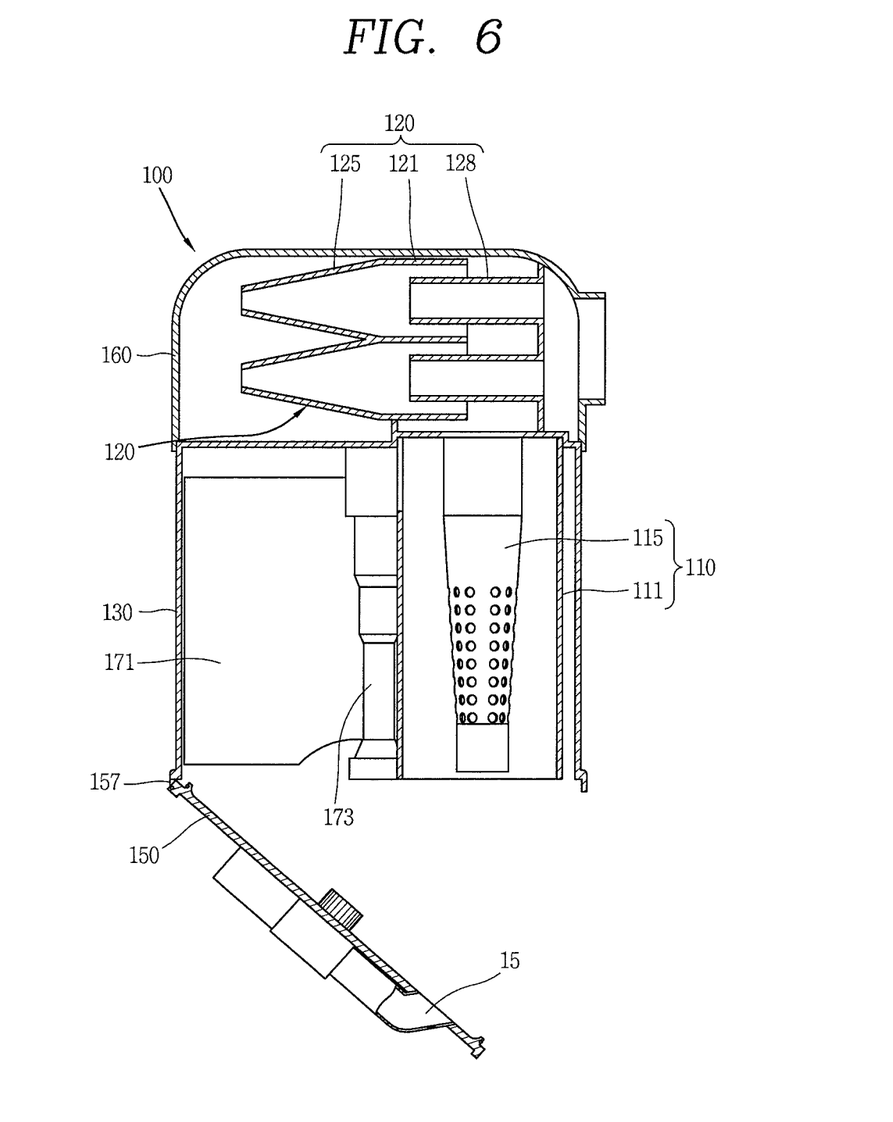
FIG. 6 is a sectional view taken along the line C-C' of FIG. 5.

FIG. 5 is a conceptual view illustrating the dust collector 100 of FIG. 1 with the lower cover 150 open, and FIG. 6 is a sectional view taken along the line C-C' of FIG. 5. Description will be given with reference to FIGS. 5 and 6.

When a predetermined amount of dust is collected in the first cyclone 110 and the first and second dust storing units 130 and 140, a user of the vacuum cleaner opens the lower cover 150 and discharges the collected dust to the outside.

The lower cover 150 is coupled to the first dust storing unit 130 by the hinge 157, so as to be open in a manner of rotating centering on the hinge 157. In response to the lower cover 150 being open, dust stuck on the mesh filter 115 of the first cyclone 110 and dust collected in the first and second dust storing units 130 and 140 may be externally discharged.

As aforementioned, since the lower cover 150 forms the bottom surface of the first cyclone 110 and the first and second dust storing units 130 and 140, the dust stuck on the mesh filter 115 of the first cyclone 110 and the dust collected in the first and second dust storing units 130 and 140 may be discharged out of the dust collector at once merely by opening the lower cover 150.

Therefore, the dust collector 100 according to the one exemplary embodiment disclosed herein has the advantage in view of discharging dust collected therein at once, compared with the related art dust collector, in which the first cyclone or the first or second dust storing unit should be individually separated from the dust collector or a cover of the first cyclone or the first or second dust storing unit should be individually open to externally discharging dust collected in the dust collector.

Figure 7:
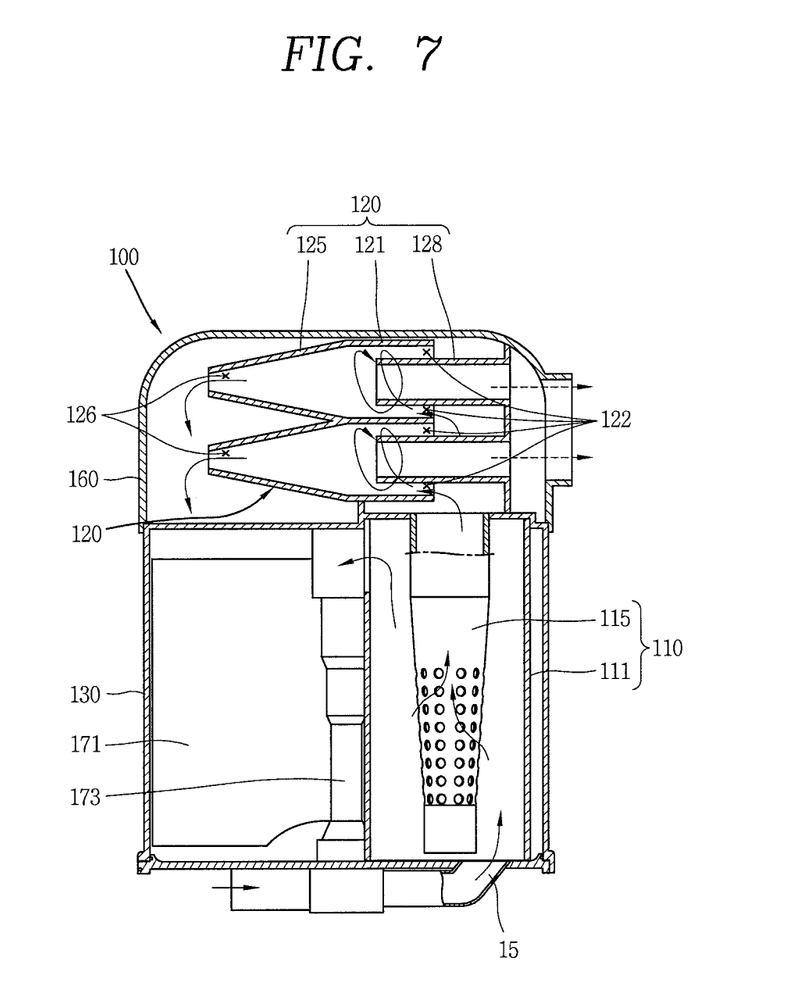
FIG. 7 is a conceptual view illustrating the flow of air or dust in a first cyclone and a second cyclone.
Figure 8:
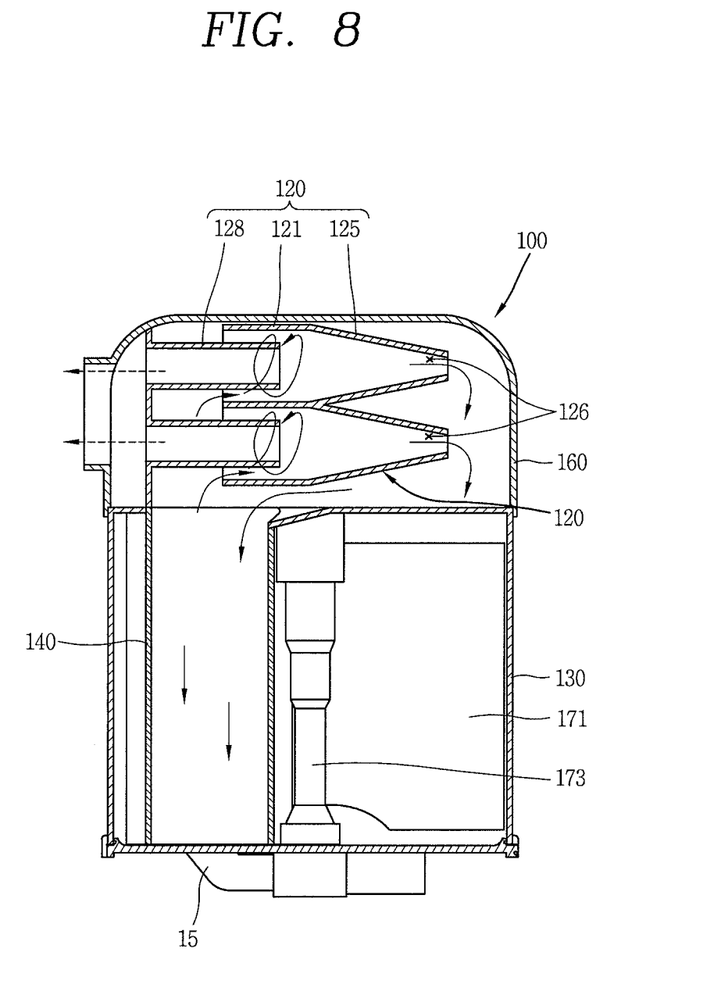
FIG. 8 is a conceptual view illustrating the flow of air or dust passing through the second cyclone.

FIG. 7 is a conceptual view illustrating the flow of air or dust in the first cyclone 110 and the second cyclones 120, and FIG. 8 is a conceptual view illustrating the flow of air or dust passing through the second cyclones 120.

Hereinafter, description will be given of a process in which external air containing foreign materials is introduced into the dust collector 100 and dust and fine dust are separated from the air, with reference to FIGS. 7 and 8.

The vacuum cleaner sucks external air containing foreign materials through a suction part 310 during a cleaning operation. The sucked air is introduced into a lower portion of the first cyclone 110 through a lower introduction pipe 15.

The air introduced into the first cyclone 110 flows upward with performing an orbiting motion. During this process, the foreign materials, such as hairs, large dust and the like, are stuck (entangled) on the mesh filter 115 or collected into the first dust storing unit 130 by being discharged through the cutoff portion 113 of the first cyclone 110 with failing to pass through the mesh filter 115.

Some of the fine dust and the air flow through an upper portion of the mesh filter 115 to be introduced into the introduction pipe 121 of the second cyclone 120 through the inlet 122 via the space of the upper surface of the first cyclone 110. The air introduced into the second cyclone 120 orbits. During the orbiting motion, the fine dust is discharged through the fine dust discharge pipe 125 of the second cyclone 120, and the air is discharged through the air discharge pipe 128.

The fine dust discharged through the fine dust discharge pipe 125 flows along the guide surface 143 to be collected into the second dust storing unit 140. The guide surface 143 may extend from an upper surface of the first dust storing unit 130 toward the second dust storing unit 140 in an inclined manner, such that the fine dust is guided along the second dust storing unit 140.

Figure 9:
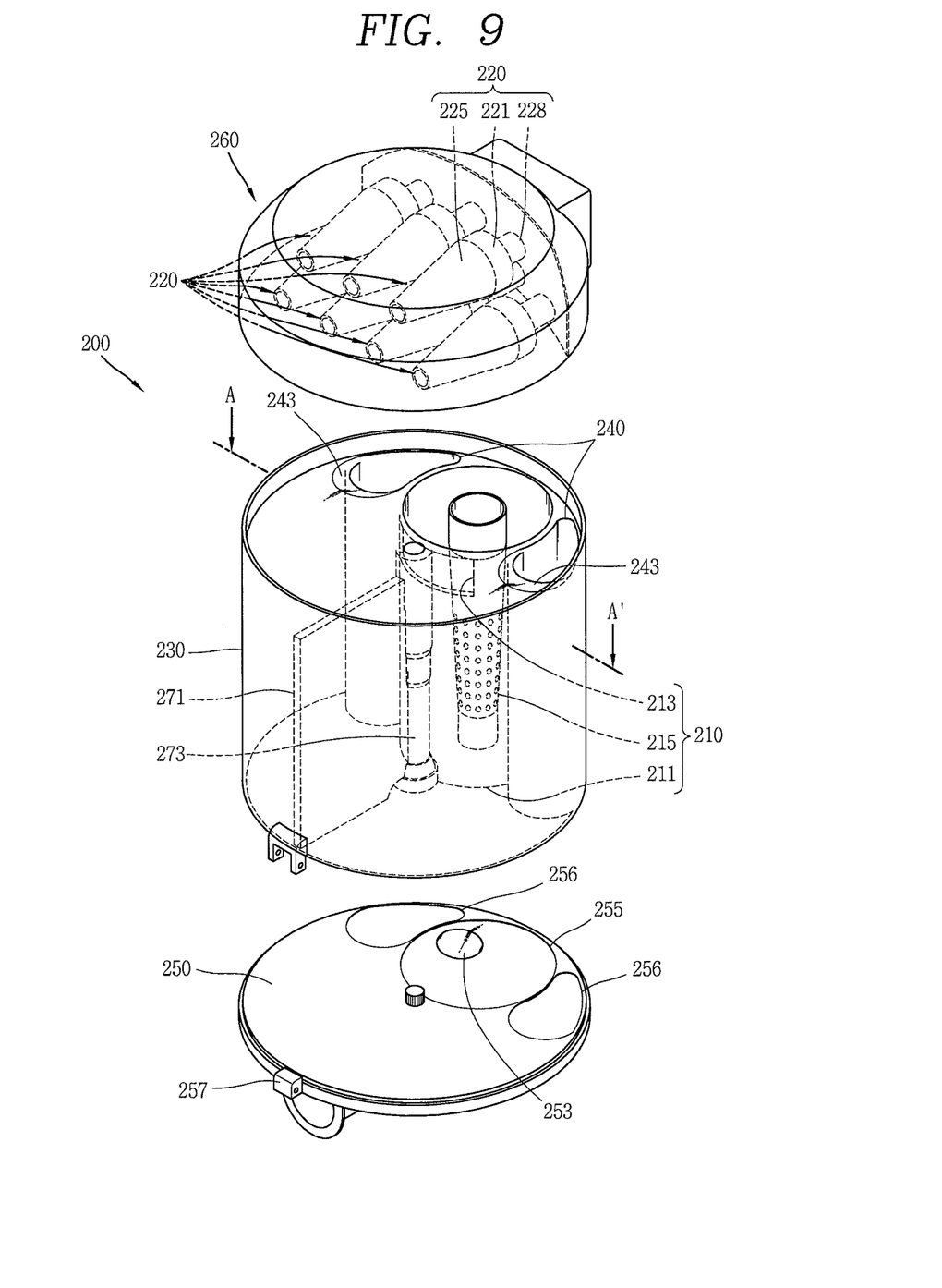
FIG. 9 is a disassembled conceptual view of a part of a dust collector for a vacuum cleaner in accordance with another exemplary embodiment disclosed herein.
Figure 10:
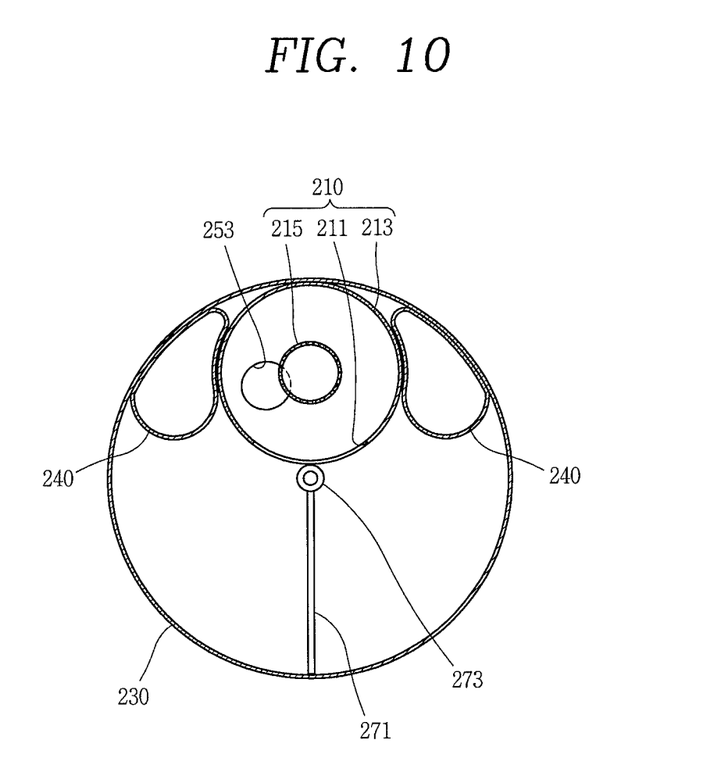
FIG. 10 is a sectional view taken along the line D-D' of FIG. 9.

FIG. 9 is a disassembled conceptual view of a part of a dust collector 200 for a vacuum cleaner in accordance with another exemplary embodiment disclosed herein, and FIG. 10 is a sectional view taken along the line D-D' of FIG. 9.

As illustrated in FIGS. 9 and 10, the dust collector 200 for the vacuum cleaner according to the another exemplary embodiment disclosed herein includes two second dust storing units 240. Each of the second dust storing units 240 is disposed to come in contact with an outer circumferential surface of a first cyclone 210 and an inner circumferential surface of a first dust storing unit 230, respectively.

Guide surfaces 243 may extend from an upper surface of the first dust storing unit 230 toward both of the second dust storing units 240, respectively, in an inclined manner, such that fine dust can be guided along both of the second dust storing units 240.

A cutoff portion 213 of the first cyclone 210 should be spaced apart from the second dust storing units 240 by a predetermined gap so as to avoid the contact with the second dust storing units 240, such that dust can be smoothly discharged from the first cyclone 210 to the first dust storing unit 230.

Meanwhile, a lower cover 250 should form a bottom surface of the first dust storing unit 230, the first cyclone 210 and the plurality of second dust storing units 240.

The configurations and operation effects of the first dust storing unit 230, a mesh filter 215, a second cyclone 220 and the like of the dust collector 200 for the vacuum cleaner according to the another exemplary embodiment are the same/like as those aforementioned in association with the dust collector 100 according to the one exemplary embodiment.

Figure 11:
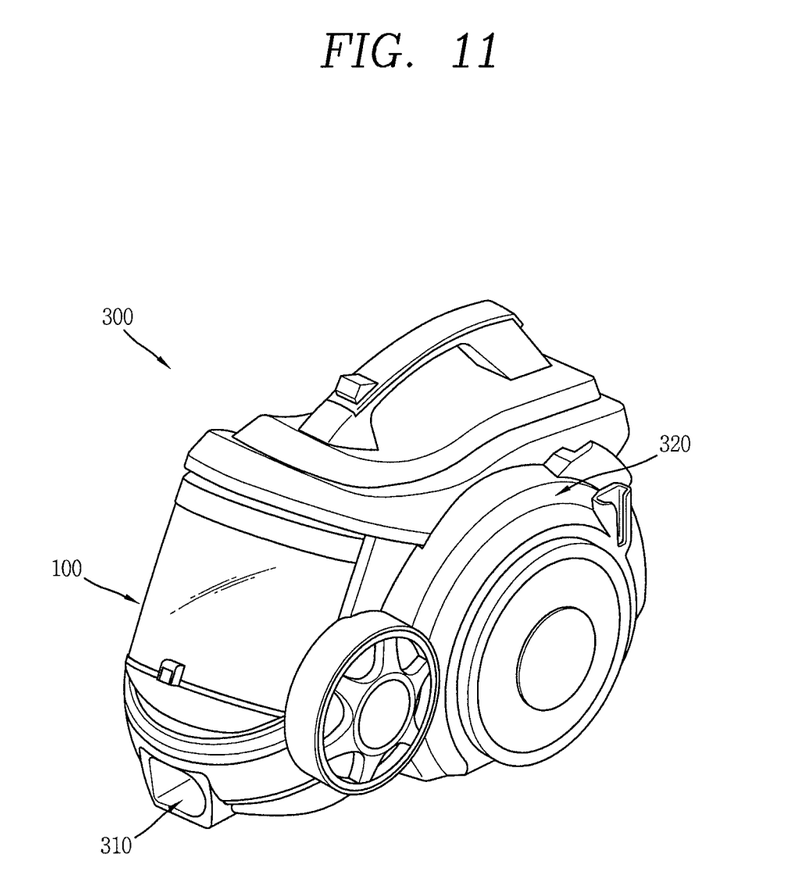
FIG. 11 is a conceptual view of a vacuum cleaner having the dust collector according to the one exemplary embodiment disclosed herein.

FIG. 11 is a conceptual view of a vacuum cleaner 300 having the dust collector 100 according to the one exemplary embodiment disclosed herein.

A main body 320 is provided with a motor generating a rotational force, and a suction part 310 sucks air containing dust. The dust collector 100 is configured to separate the dust from the air introduced from the suction part and discharge the separated dust. The dust collector 100 has been aforementioned in detail, so description thereof will be omitted.

The configurations and methods of the dust collector for the vacuum cleaner in the aforesaid embodiments may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A dust collector for a vacuum cleaner, the dust collector comprising:
    a first dust storing unit;
    a first cyclone provided in the first dust storing unit, the first cyclone being configured to separate dust from air introduced into the first cyclone from a lower portion of the first cyclone and discharge the separated dust into the first dust storing unit;
    a second dust storing unit;
    a second cyclone provided above the first cyclone to extend in an intersecting direction with an extending direction of the first cyclone, the second cyclone being configured to separate fine dust from the air introduced into the second cyclone from the first cyclone and discharge the separated fine dust into the second dust storing unit;
    a lower cover defining a bottom surface of the first dust storing unit, the second dust storing unit and the first cyclone;-and
    a hinge coupling the lower cover to the first dust storing unit, the hinge permitting the lower cover to be opened to discharge dust collected in the first dust storing unit, the second dust storing unit and the first cyclone; and
    a compression plate provided in the first dust storing unit the compression plate being rotatable in at least one direction about a central shaft to compress dust in the first dust storing unit to secure space so that more dust may be collected,
    wherein the first cyclone is disposed eccentrically from the central shaft so as not to interfere with rotational motion of the compression plate, and
    wherein the lower cover has an introduction opening formed therein through the bottom surface of the first cyclone to permit dust to be introduced into the first cyclone through the introduction opening.

2. The dust collector of claim 1, wherein the first cyclone comprises a mesh filter configured to separate the dust from the air in a filtering manner.

3. The dust collector of claim 2, wherein an upper portion of the mesh filter is connected to an inlet of the second cyclone such that air that has passed through the mesh filter is introduced into the second cyclone.

4. The dust collector of claim 2, wherein the mesh filter has a conic shape that becomes narrower from a top of the mesh filter to a bottom of the mesh filter, such that the dust filtered by the mesh filter and stuck on the mesh filter is separated from the mesh filter upon being open.

5. The dust collector of claim 4, wherein the mesh filter is provided in the first cyclone and extends substantially in a same direction as the extending direction of the first cyclone.

6. The dust collector of claim 1, wherein the second dust storing unit is provided in the first dust storing unit.

7. The dust collector of claim 1, wherein the second dust storing unit comprises a guide surface that is inclined to guide fine dust separated from the air by the second cyclone into the second dust storing unit.

8. The dust collector of claim 6, wherein the second dust storing unit extends substantially in a same direction as an extending direction of the first dust storing unit.

9. The dust collector of claim 8, wherein the second dust storing unit has a cylindrical shape that contacts an outer circumferential surface of the first cyclone and an inner circumferential surface of the first dust storing unit.

10. The dust collector of claim 8, wherein the second dust storing unit comprises two second dust storing units that each contact an outer circumferential surface of the first cyclone and an inner circumferential surface of the first dust storing unit.

11. The dust collector of claim 1, wherein the second cyclone comprises a plurality of second cyclones extending in parallel with one another.

12. The dust collector of claim 11, wherein the plurality of second cyclones are stacked into plural layers.

13. The dust collector of claim 1, wherein the second dust storing unit is provided in the first dust storing unit,
    wherein the second dust storing unit comprises a guide surface that is inclined to guide fine dust separated from the air by the second cyclone into the second dust storing unit,
    wherein the second dust storing unit extends substantially in a same direction as an extending direction of the first dust storing unit, and
    wherein the second cyclone comprises a plurality of second cyclones extending in parallel with one another.

14. The dust collector of claim 1, wherein an extending direction of the second cyclone is orthogonal to the extending direction of the first cyclone.

15. A vacuum cleaner, comprising:
    a main body configured to produce a suction force;
    a suction part configured to suck air containing dust; and
    a dust collector configured to separate the dust from the air introduced from the suction part and discharge the separated dust, wherein the dust collector comprises:
    a first dust storing unit;
    a first cyclone provided in the first dust storing unit, the first cyclone being configured to separate dust from air introduced into the first cyclone from a lower portion of the first cyclone and discharge the separated dust into the first dust storing unit;
    a second dust storing unit;
    a second cyclone provided above the first cyclone to extend in an intersecting direction with an extending direction of the first cyclone, the second cyclone being configured to separate fine dust from the air introduced into the second cyclone from the first cyclone and discharge the separated fine dust into the second dust storing unit;
    a lower cover defining a bottom surface of the first dust storing unit, the second dust storing unit and the first cyclone;
    a hinge coupling the lower cover to the first dust storing unit, the hinge permitting the lower cover to be opened to discharge dust collected in the first dust storing unit, the second dust storing unit and the first cyclone; and
    a compression plate provided in the first dust storing unit the compression plate being rotatable in at least one direction about a central shaft to compress dust in the first dust storing unit to secure space so that more dust may be collected, wherein the first cyclone is disposed eccentrically from the central shaft so as not to interfere with rotational motion of the compression plate, and wherein the lower cover has an introduction opening formed therein through the bottom surface of the first cyclone to permit dust to be introduced into the first cyclone through the introduction opening.

16. The vacuum cleaner of claim 15, wherein the second dust storing unit is provided in the first dust storing unit.

17. The vacuum cleaner of claim 16, wherein the second dust storing unit has a cylindrical shape that contacts an outer circumferential surface of the first cyclone and an inner circumferential surface of the first dust storing unit.

18. The vacuum cleaner of claim 15, wherein the second cyclone comprises a plurality of second cyclones extending in parallel with one another.

19. The vacuum cleaner of claim 18, wherein the second dust storing unit is provided in the first dust storing unit, wherein the second dust storing unit comprises a guide surface that is inclined to guide fine dust separated from the air by the second cyclone into the second dust storing unit, and wherein the second dust storing unit extends substantially in a same direction as an extending direction of the first dust storing unit.

20. The vacuum cleaner of claim 15, wherein an extending direction of the second cyclone is orthogonal to the extending direction of the first cyclone.

* * * * *